United States Patent [19]

Frick

[11] 4,389,181
[45] Jun. 21, 1983

[54] WIDE BAND EXTRUDER NOZZLE

[75] Inventor: Richard H. Frick, Neenah, Wis.

[73] Assignee: Kimberly-Clark Corporation, Neenah, Wis.

[21] Appl. No.: 305,046

[22] Filed: Sep. 24, 1981

[51] Int. Cl.³ .............................................. B29F 3/04
[52] U.S. Cl. .................................. 425/461; 264/176 R; 264/216; 425/376 A; 425/466
[58] Field of Search ............ 425/466, 461, 465, 376 A; 264/176 R, 212, 216; 118/407

[56] References Cited

U.S. PATENT DOCUMENTS

| | | | |
|---|---|---|---|
| 2,217,627 | 10/1940 | Tanzi | 425/192 R |
| 2,364,435 | 12/1944 | Foster et al. | 264/216 |
| 2,754,544 | 7/1956 | Bicher, Jr. | 425/466 |
| 2,859,475 | 11/1958 | Tornberg | 425/466 |
| 3,085,289 | 4/1963 | Van Riper | 425/461 |
| 3,142,090 | 7/1964 | Hoffman et al. | 425/466 |
| 3,178,770 | 4/1965 | Willis | 425/466 |
| 3,188,264 | 6/1965 | Holden | 264/177 R |
| 3,241,183 | 3/1966 | Tyrner | 425/466 |
| 3,340,573 | 9/1967 | Sommerfeld | 425/466 |
| 3,360,823 | 1/1968 | Tyrner | 425/466 |
| 3,387,328 | 6/1968 | Winstead | 264/176 R |
| 3,484,513 | 12/1969 | Paoli | 264/148 |
| 3,810,965 | 5/1974 | Sen et al. | 264/176 R |
| 3,823,053 | 7/1974 | Straub et al. | 425/466 |
| 3,860,383 | 1/1975 | Sirevicius | 425/461 |
| 3,861,850 | 1/1975 | Wallis | 425/461 |
| 3,984,508 | 10/1976 | Solop | 425/466 |
| 4,087,222 | 5/1978 | Noel | 425/107 |
| 4,108,590 | 8/1978 | Kontz | 425/466 |
| 4,217,322 | 8/1980 | Sugano et al. | 425/466 |
| 4,259,220 | 3/1981 | Bunnelle et al. | 524/505 |
| 4,299,186 | 11/1981 | Pipkin et al. | 118/407 |

FOREIGN PATENT DOCUMENTS 2290290  7/1976  France .......................... 264/216

Primary Examiner—Jeffery R. Thurlow
Attorney, Agent, or Firm—Richard C. Ruppin

[57] ABSTRACT

An extruder nozzle for producing a relatively wide flat ribbon of extruded fluid is provided. The extruder nozzle includes a groove in communication with the orifice of the nozzle, the groove being generally arcuate in shape and so dimensioned that the ends of the arc are closer to the extrusion point than is the center so as to cause the orifice to fill completely and thereby permit the extrusion of a relatively wide flat ribbon. A shim means is provided to establish the size of the orifice and to cut off the arcuate groove at each of its ends to establish a reservoir of fluid at each end of the groove and thereby eliminate the formation of a needle or the like at the lateral edges of the extruded ribbon. Shim means of various thicknesses may be utilized to control the thickness (or depth) of the extruded ribbon.

4 Claims, 6 Drawing Figures

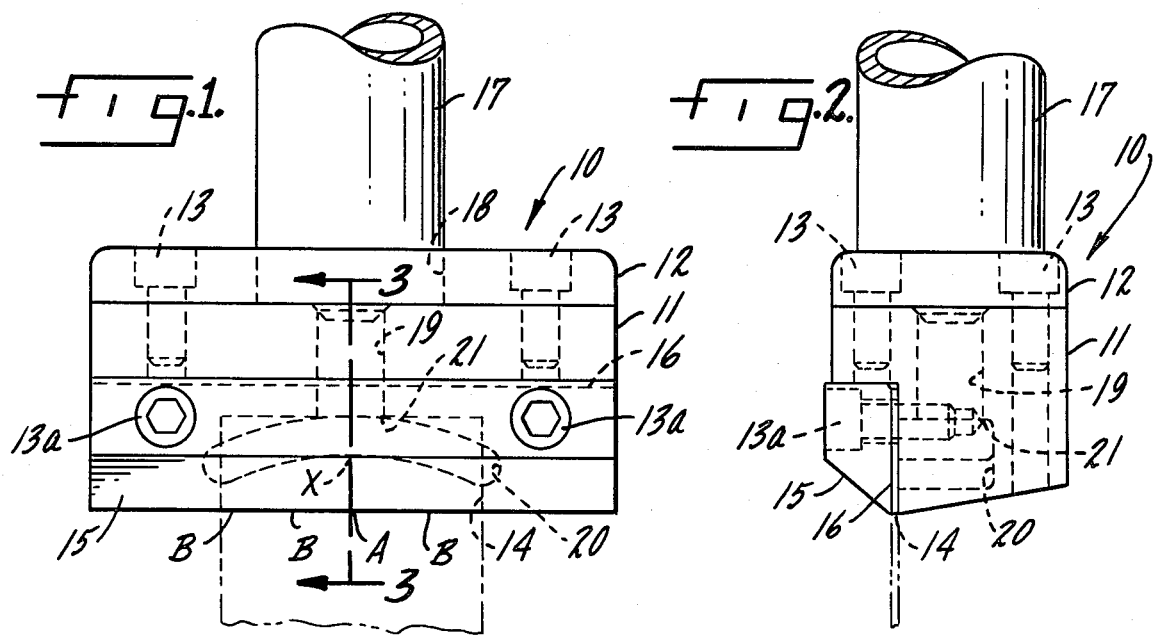
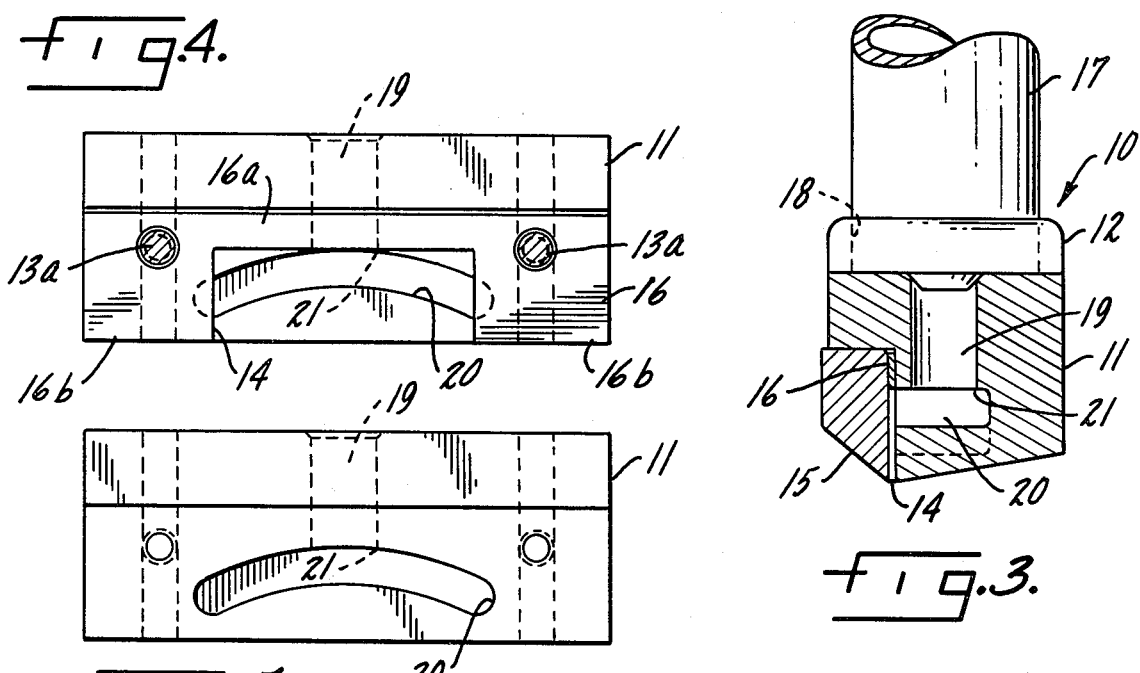
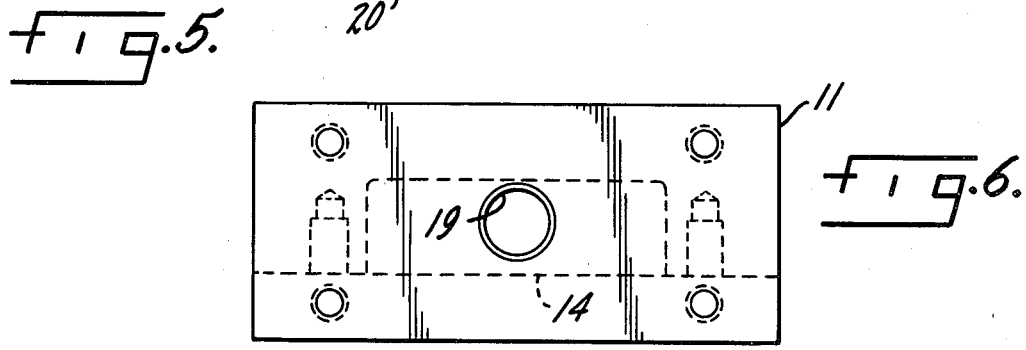

WIDE BAND EXTRUDER NOZZLE

BACKGROUND OF THE INVENTION

1. Field of the Invention

The present invention relates generally to extruder nozzles, and, more particularly, to an extruder nozzle suitable for use in producing a relatively wide flat ribbon of extruded material.

2. Description of the Prior Art

Many different devices for extruding plastic and other materials are known to the extruder art. For example, one such device is disclosed in U.S. Pat. No. 2,217,627, which teaches a die having a substantially rectangular-shaped orifice for forming the dough used in making spaghetti into threads or ribbons. In the die shown therein, abutments or baffles are included in the fluid channels in the die for diverting the flow of the fluid to be extruded at points adjacent to the center of the die to a greater extent than at points remote from the center of the die in order to insure that the fluid is delivered to all parts of the die at a uniform pressure throughout its length. Similarly U.S. Pat. No. 2,859,475 shows an extrusion die for plasticized materials, wherein slidable orifice-closing members are utilized to adjust the width of the web to be produced. The width of the web produced by the die disclosed therein can be made in any dimension which is less than the maximum width of the orifice of the die.

Thus, it is an object of the present invention to provide an extruder nozzle which extrudes its fluid in a relatively wide ribbon.

It is a further object of the invention to provide an extruder nozzle capable of forming a ribbon which is relatively flat across its entire cross section. A related object is to provide such an extruder nozzle which may be utilized for extruding fluids having adhesive or elastomeric properties.

Yet another object of the present invention is to provide an extruder nozzle which may be utilized to form a ribbon of alternative various thicknesses.

Still another object of the invention lies in the provision of a nozzle which is relatively simple in construction.

These and other objects and advantages of the present invention will become apparent from the drawings and detailed description of the preferred embodiments.

While the invention is susceptible of various modifications and alternative forms, specific embodiments thereof are described in detail herein. It should be understood, however, that it is not intended to limit the invention to the particular forms disclosed, but, on the contrary, the intention is to cover all modifications, equivalents, and alternatives falling within the spirit and scope of the invention as expressed in the appended claims.

SUMMARY OF THE INVENTION

The present invention is predicated on the discovery that a relatively wide flat ribbon of extruded material may be formed by an extruder nozzle which includes a groove in communication with the orifice in the nozzle, the groove being generally arcuate in shape and so dimensioned that the ends of the arc are closer to the extrusion point than is the center. A nozzle containing such a groove allows the fluid to flow with less restriction at the ends of the extruder orifice than in the center of the orifice so as to cause the orifice to fill completely and permit the extrusion of a relatively flat ribbon. A shim means is provided to establish the size of the orifice and to cut off the arcuate groove at each of its ends and thus establish a reservoir of fluid at the ends of the groove so as to eliminate the formation of a needle or the like at the lateral edges of the extruded ribbon. Shim means of various thicknesses may be utilized to control the thickness (or depth) of the extruded ribbon.

BRIEF DESCRIPTION OF THE DRAWINGS

FIG. 1 is a front plan view of the extruder nozzle of the present invention;

FIG. 2 is a side plan view of the nozzle of the present invention with major components thereof indicated in dashed lines.

FIG. 3 is a side section view of the nozzle of the present invention taken along line 3—3 of FIG. 1;

FIG. 4 is a front plan view of the portion of the nozzle below the top plate showing the shim plate in position in the nozzle;

FIG. 5 is a front view of the portion of the nozzle below the top plate with the shim plate removed; and FIG. 6 is a top view of the block of the extruder nozzle.

DETAILED DESCRIPTION OF THE PREFERRED EMBODIMENTS

In accordance with the present invention, a nozzle 10 is provided which includes a main body block 11, a top plate 12 connected by means of bolts 13 to the main body block 11 at the top end of the block 11, a generally rectangularly-shaped orifice 14 through which the fluid material is extruded in a relatively wide flat ribbon, and a front plate 15 connected to the block 11 by means of bolts 13a and forming one end boundary of the orifice 14. The main body block 11 forms the end boundary of the orifice 14 opposite the end boundary of the orifice formed by front plate 15. A shim plate 16 is located between the front plate 15 and the block 11 for the reasons explained herein.

The material to be extruded is fed from a source (not shown) to the nozzle 10 through a supply line 17 which extends through an annular chamber 18 in the top plate 12. The supply line 17 is in communication with a channel 19 in the main body block 11 and the channel 19 is likewise in communication with an arcuate groove 20 in the main body block 11. The arcuate groove 20, in turn, is in alignment with the orifice 14. Thus the fluid material to be extruded may be readily fed to the orifice from the supply line 17 through the arcuate groove 20. To facilitate the flow of fluid from the supply line 17 into the groove 20, the channel 19 terminates at its end furthest from the arcuate groove in a frusto-conical opening with the smaller portion of the frusto-conical opening facing in the direction of the arcuate groove.

An important aspect of the present invention is the arcuate groove 20. It provides a fluid restrictive passage within the nozzle 10 so that the relative restriction of the fluid flowing through the groove and out through the orifice is the same across the entire cross-section of the orifice. Importantly, the ends of the arcuate groove 20 are closer to the extrusion point than the center of the groove, and the groove is dimensioned so as to cause fluid to flow with less restriction at the ends of the orifice than at the center of the orifice thereby causing the orifice to fill completely with fluid. In the illustrative embodiment, the axis of the arch is generally at right angles to the exit hole 21 of the channel 19 and to the longitudinal axis of the rectangularly shaped orifice so that the path length of the liquid passing through the nozzle to the center of the orifice is extended by approximately the height of the arch in the arcuate groove. As a result, the time-viscosity characteristic of the fluid passing to the orifice through the arcuate groove 20, for example, from a point X (indicated in the groove in FIG. 1) to a point A is the same as the time-viscosity characteristic of the fluid from the point X to points B (also shown in FIG. 1). Thus, the rate of flow of fluid along the entire transverse axis of the orifice is equalized to create a uniform flow of fluid at the orifice and thereby facilitate the formation of a relatively even wide band of the extruded material.

In accordance with another aspect of the present invention, a shim plate 16 located between the front plate 15 and body block 11 is provided in order to control the thickness of the ribbon extruded from the nozzle 10. The shim plate 16 as best seen in FIG. 4 is a substantially flat U-shaped member having an elongated central portion 16a and two opposed legs 16b extending from the central portion 16a. The elongated central portion 16a further provides spacing means between the front plate 15 and body block 11. Thus the shim plate 16 may be used to adjust the rate at which the fluid material is extruded from the orifice and thereby control the ribbon thickness or depth. By providing shim plates of variable thicknesses, the relative size of the orifice may likewise be varied and thus the ribbon thickness may be suitably controlled to the desired thickness. For example, the use of a relatively narrow shim plate 16 will permit relatively less fluid to flow through the orifice 14 so that a relatively thin extruded ribbon is obtained. On the other hand, as an illustration, the use of a relatively thick shim plate 16 will permit comparatively more fluid to flow through the orifice 14 so that a relatively thicker ribbon is obtained.

Further, the legs 16b of the shim plate 16 form the opposite end boundaries of the nozzle orifice 14 and thus the shim plate 16 is utilized to establish the length of the orifice 14. Further, and importantly, the shim plate 16 is so dimensioned that its legs 16b cut off the arcuate groove 20 at each of its ends so as to establish a reservoir of fluid at each end of the arcuate groove 20. In this manner, the extruded ribbon formed by the nozzle is of relatively even thickness and does not have a needle or bead at its lateral side edges.

Also, it should be appreciated that the length of the orifice 14 may be varied by the utilization of a shim plate 16 whose legs 16b are of various widths so that the legs 16b cut off more or less of the arcuate groove, as is desired. Thus, any width of extruded material may be formed, up to the width of the orifice, but, preferably somewhat smaller as described above to cut off the ends of the arcuate groove 20 and thereby eliminate the formation of a needle or bead at the side edges of the extruded ribbon.

The front plate 15 may be chamfered at its end adjacent the shim plate 16, i.e., at the end opposite the orifice, and the shim plate 16 may form a rounded edge at its end adjacent the chamfered end of the front plate to facilitate a snug fit between the front plate and shim plate when the nozzle is assembled.

In order to substantially reduce the likelihood of the nozzle contacting or otherwise interferring with the extruded fluid as it is extruded for example onto a desired surface in proximity to the nozzle, the front plate 15 and main body block 11 of the nozzle are beveled as best illustrated in FIGS. 2 and 3 to define a tip for the nozzle at the orifice 14. The nozzle is thus clear of the extruded fluid and a clean extrudate is facilitated.

An example of a viscous adhesive material for which the nozzle of the present invention may be used to extrude a relatively wide flat ribbon of material is the rubbery block copolymer described in U.S. Pat. No. 4,259,220 issued Mar. 31, 1981 to Bunnelle et al. and assigned to H. B. Fuller Co. of St. Paul, Minn.

What is claimed is:

1. An extruder nozzle for producing a relatively wide flat ribbon of extruded fluid comprising in combination, a fluid supply inlet, a main body portion forming a first side boundary of an elongated channel of constant and generally rectangular cross-section terminating in an orifice, said main body portion having a groove therein, the mean cross sectional area of the groove being substantially greater than the cross-sectional area of the supply line, said groove communicating with said inlet and being substantially arcuate in shape and positioned in said main body portion so that the ends of said groove are closer to the orifice than is the center of said groove, said groove being dimensioned so as to cause a fluid to flow generally uniformly through the entire length of the orifice so as to cause the orifice to fill essentially completely with fluid, a front cover plate for providing a second side boundary of the channel opposite the first side channel boundary formed by said main body portion, and a shim means positioned between said main body portion and said front cover plate to establish the cross sectional area of the channel from which the fluid is extruded, said shim means forming two opposed end boundaries of said channel and dimensioned so that said arcuate groove in said main body portion is terminated at both its ends by said shim means thereby establishing a reservoir of fluid at each end of said arcuate groove to facilitate extruding a ribbon of relatively even thickness from said nozzle.

2. The extruder nozzle of claim 1 wherein said shim means is generally U-shaped so that the opposed legs of said shim means form said opposite end boundaries of said orifice.

3. The extruder nozzle of claim 1 wherein the thickness of said ribbon may be controlled by providing a shim means of variable thickness.

4. The extruder nozzle of claim 1 wherein said front plate and said main body portion are beveled so as to define a tip at said orifice so that said extruded ribbon is essentially free of other interference with said nozzle.

* * * * *